June 24, 1952 — G. E. GAGNIER — 2,601,512
SELF-SUPPORTING MOLDED STRUCTURE
Filed Aug. 5, 1947
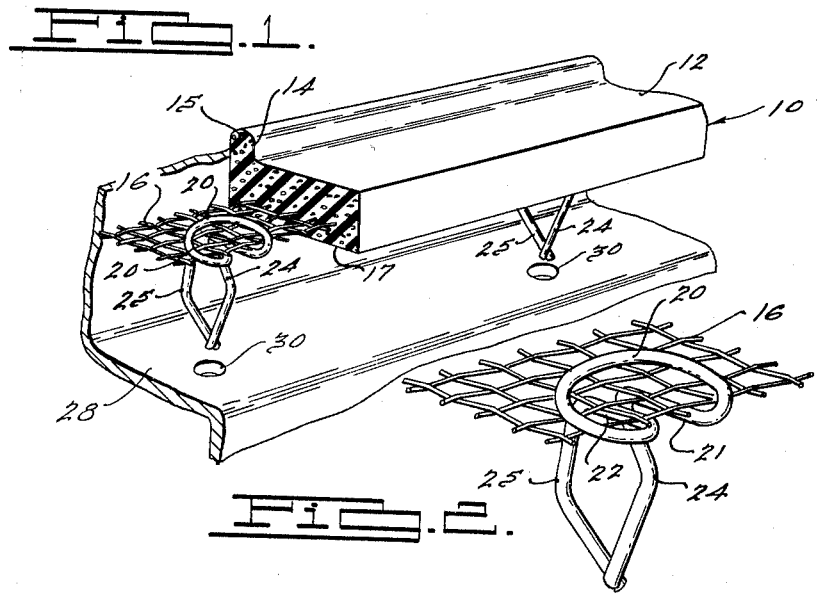
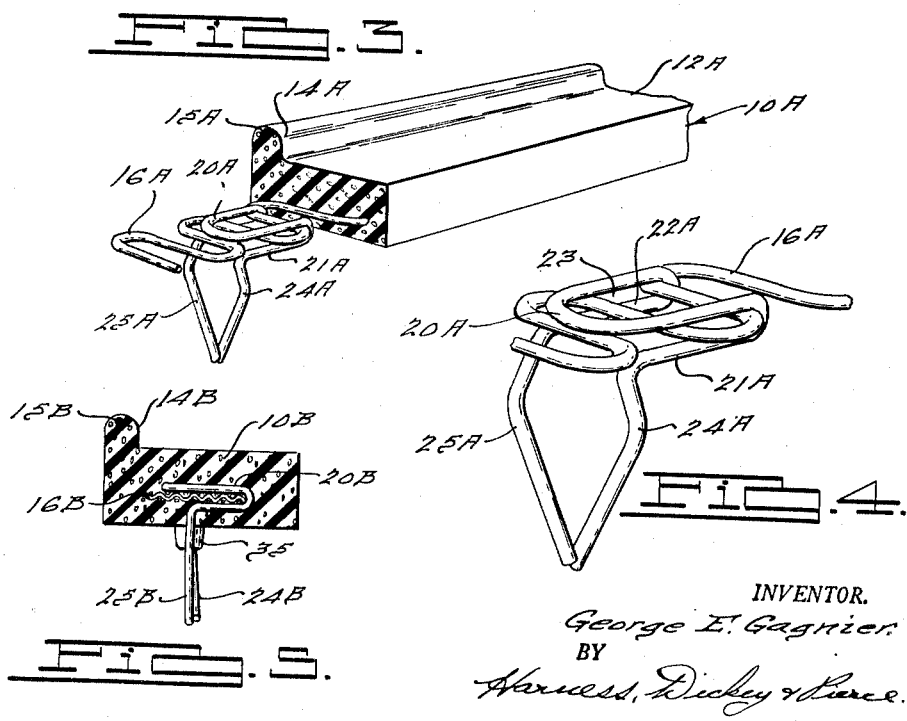
INVENTOR.
George E. Gagnier.
BY
Harness, Dickey & Pierce
ATTORNEYS.

Patented June 24, 1952

2,601,512

UNITED STATES PATENT OFFICE 2,601,512

SELF-SUPPORTING MOLDED STRUCTURE

George E. Gagnier, Detroit, Mich., assignor to Gagnier Fibre Products Company, Detroit, Mich., a corporation of Michigan Application August 5, 1947, Serial No. 766,169

3 Claims. (Cl. 20—69)

The present invention relates to self-supporting molded articles, and to methods of construction and attachment thereof, being particularly directed to improvements calculated to provide more effective and permanent attachment of flexible weather strippings, gasketings and the like with respect to supporting structures upon which they are mounted, while affording economies in the cost of manufacture and of installation, in addition to effecting important structural improvements thereof.

While the invention will be found useful in connection with the fabrication and attachment of many types of resilient gasketing and other relatively soft molded materials designed for attachment to a supporting body, it is especially useful in connection with weather stripping for doors and windows such as those of automobiles and other vehicles. Such strip materials are subjected to very severe service conditions, and the provision of adequate and permanent attaching means of simple, inexpensive and quickly operable character has constituted a troublesome problem which has in fact never been fully solved. The difficulty of the problem is indicated by the frequency with which the weather strippings around the doors and windows of automobiles become loosened and partly or entirely detached after relatively short service, admitting weather and drafts to the interiors of the vehicles, or requiring repairs. It is most common, where soft rubber or sponge rubber is used for such weather stripping, to attempt to cement the strip directly to the metal. Since the weather stripping itself and the crevices around it tend to trap moisture and to hold it by capillary action, it is inevitable that the water will find its way through any commercially feasible protective coating upon a steel body, such as is used upon automobiles, and induce rusting. This action may occur very quickly where salt is present or the atmosphere is corrosive, as in many cities where sulphurous coal smoke combines with rainwater to form dilute sulphurous acid. Thus very rapid oxidation or rusting of the metal close to and underneath the weather stripping will often cause quick scaling or flaking of rust at the surface of the metal and this type of rust is itself of such nature that it holds additional moisture in a manner calculated to very rapidly loosen weather strip applied by means of any type of adhesive. This action may occur so fast that within a relatively few months, under certain conditions, a molding initially well cemented upon an adequately prepared surface becomes entirely free and falls off.

Attempts have been made to incorporate metallic fastening elements directly in rubber weather strips of the type in question, but since it is not feasible from the standpoint of cost to actually vulcanize the rubber to metal fastenings, or otherwise to provide a molecular bond between the rubber and the metal, the portions of the soft strip material surrounding each fastening element become relatively weak areas, their strength being limited by the overlapping areas of the strip and the fastening element. With arrangements of the latter character heretofore known, therefore, it has been found that the strip material tends to separate and pull free from the individual fastening devices. The forces tending to pull the strip away from its supporting surface are sometimes considerable, since if the strip tends to stick to the movable element, such as the door or window it serves to seal, efforts to open the door or window tend to pull the stripping directly away from its support.

The present invention aims to overcome the difficulties outlined above, and to provide an improved reinforced, self-supporting molded rubber article particularly suitable for gasketing, weather stripping and the like, which is provided with fastening means and with continuous reinforcing means so related to the fastening means and to the surrounding gasketing material that the latter may be most effectively secured to any desired supporting surface in a manner more permanent than has heretofore been possible with fastening means of comparable simplicity and inexpensive character.

A related object is to provide such an improved self-supporting weather strip construction which may be attached more quickly, at lesser expense and without the use of adhesives.

Still another object is to provide an improved strip of the character indicated incorporating novel interrelated reinforcing and attaching means which does not interfere with bending the strip in any desired plane, whereby the strip may be attached to supporting surfaces of varying and irregular configurations.

Other objects and advantages will be apparent upon consideration of the present disclosure in its entirety.

In the drawing:

Figure 1 is a perspective view of a short piece of weather stripping constructed in accordance with the present invention and suitable for use in weather stripping vehicle doors, an adjacent supporting portion of a door being fragmentarily shown, a part of the molding being broken away to show the interior construction of the reinforcing and attaching means;

Fig. 2 is a perspective view on an enlarged scale with the rubber body removed, showing one of the attaching elements and adjacent portions of the reinforcing means;

Fig. 3 is a view similar to Fig. 1 showing a somewhat modified construction;

Fig. 4 is a view corresponding to Fig. 2 but showing the modified construction; and Fig. 5 is a cross section of another somewhat modified weather stripping construction.

Referring now to the drawing, reference character 10 designates the body of a strip, which may as previously indicated comprise weather stripping suitable for sealing the opening around a metal door such as is commonly used in motor vehicles. The strip may be formed of relatively soft and resilient material such as sponge rubber and may if desired be molded in the form of an endless band proportioned to fit the opening or door to which it is applied, or alternatively it may be fabricated as a long or continuous strip adapted to be cut into lengths. The face of the strip against which the door or the edge of the doorway is intended to seat is designated 12 and such face of the strip may be provided with an integral flange 14 projecting upwardly therefrom and adapted to lie against the margin of the closure. The flange 14 is indicated as reinforced as by means of a longitudinal cord 15 molded in and near the free edge thereof.

Flexible mesh reinforcing material 16 which may be formed of wire is molded in the body of the strip, the body being indicated as of rectangular cross section with the reinforcing mesh parallel to and somewhat spaced above the bottom surface 17 which bears against the support which is illustratively presumed to be the door, when the strip is installed.

Before it is molded in the strip the ribbon-like reinforcing mesh is equipped with a plurality of fastening clips of the general type disclosed in Place Patent No. 1,679,266. Such fasteners are fabricated of a single length of resilient spring wire, having a head 20 formed of a looped section which constitutes almost a complete circle, the ends of the near-circular head portion having inwardly extending parallel arms 21 and 22 lying substantially in the plane of the head, while its shank is formed of integral holding leg portions 24, 25 projecting outwardly substantially perpendicularly from the ends of the arms 21 and 22. Legs 24, 25 diverge from one another for approximately one half their length, and then converge toward one another to substantially meeting but overlapping relation at their extremities. It will be seen that due to the resiliency of the wire the holding leg portions 24, 25 may move toward and away from one another as they are projected through or into a socket or opening in any suitable support to which they may be applied, the overlapping ends crossing one another scissors-fashion as the legs are thus moved laterally. Since in the relaxed condition the legs are substantially separated from one another at their upper extremities, the fastener resiliently holds itself in position with respect to an opening of appropriate size in a panel to which the fastener is to be attached, for example. In Fig. 1 a typical sheet metal supporting portion 28 is indicated, provided with openings as 30 which are slightly smaller than the relaxed distance between the arms 24, 25 at their upper extremities, so that when the fastener is inserted in the opening and pushed down until the head portion lies as close as possible to the panel 28, the legs 24, 25 are maintained under constant tension.

Prior to its incorporation in the molding 10 the reinforcing mesh 16 is provided with Place-type holding clips of the indicated character arranged at predetermined spaced intervals, the clips being applied to the mesh with the head loop 20 above the mesh and the arms 21, 22 below the mesh. The head and arm portions thus serve as a retaining clip to position the fastener assembly with respect to the mesh, from the plane of which the legs 24, 25 then project substantially perpendicularly. The soft rubber or other strip material is then molded around the mesh and the head portions of the attached fasteners in such manner that the legs 24, 25 project perpendicularly from the bottom 17 of the strip.

It will be appreciated that it is only necessary to space the openings 30 in the support 28 conformably to the spacing of the fasteners and that the strip may be attached simply by inserting the ends of the legs 24, 25 in the openings and forcing them thereinto by pushing against the top of the strip over the heads of the fasteners. Since when the strip is in place the wire forming the leg and head portions of the fastener is somewhat stressed and the upper divergent portions of the legs 24, 25 tend constantly to separate, the leg portions of the fasteners not only yieldably maintain the strip in position, but exert a camming action which continuously urges the strip against the surface of the support as 28.

In the modified construction shown in Figs. 3 and 4 the reinforcing mesh 16 is replaced by a flat sinuous zigzag reinforcing wire 16A molded in corresponding fashion in the body of the strip 10A, which is again indicated as suitable for use as a weather strip molding for vehicle doors and the like, although it will be evident as before that the details of configuration and use of the strip are not restricted to the illustrative embodiments depicted. The zigzag convolutions of the sinuous reinforcing wire 16A are somewhat spaced from one another to permit attachment of a spring wire fastener which, although its general functioning is similar to that of the fastener employed in the first embodiment above described, preferably corresponds more nearly to the fastener construction disclosed in patent to Place No. 2,057,587. The head portion of this fastener is laterally offset from the plane of the attaching legs 24A, 25A, and the head portion 20A consists of a U-shaped section bent downwardly and retrovertly at the ends to form laterally extending parallel arms 21A, 22A spacedly underlying the head. At their ends nearest the bight portion of the U-shaped head the arms 21A, 22A are bent downwardly substantially perpendicularly to the head and arms to form legs 24A, 25A corresponding in arrangement and functioning to legs 24, 25 previously described. The spacing between the arm portions 21A, 22A and the head portion 20A will be seen to form a laterally directed slotlike opening designated 23, adapting the fastener to be slipped over the edge of any suitable relatively thin supporting member or member to be supported.

In the construction shown in Figs. 3 and 4 the lateral spacing of the arms 21A, 22A is somewhat less than the transverse length of each convolute portion of the reinforcing element 16A, so that the fastener may be slipped sidewise over one or more such convolutions to the position clearly illustrated in Fig. 4. Fasteners are attached in this manner at regularly spaced intervals to provide a preassembled reinforcing and fastening structure which may be molded or otherwise embedded in the body of the strip as in the embodiment first described.

The wire of which the reinforcing element 16A is formed is of relatively ductile character, and the reinforcing mesh 16 of the first described embodiment is also easily bendable, so that the strip may be easily shaped to follow irregular contours or corners around the opening or upon the other surface portions to which the strip is to be applied.

In the further modified construction shown in Fig. 5, in which parts analogous to those previously described are designated by like reference characters distinguished by the letter B, small integral and preferably tapering plug portions 35 are molded upon the undersurface of the strip body between the legs 24B, 25B of each fastener. The plug portions are so proportioned that they fit tightly in the openings in the supporting panel and are pressed around the legs of the fastener when the molding is seated against its supporting surface. The openings around the fasteners are thus effectively sealed when the strip is in place.

While it will be apparent that the preferred embodiments of the invention herein described are well calculated to fulfill the objects and advantages first above stated, it will be appreciated that the invention is susceptible to variation, modification and change without departing from the fair meaning and proper scope of the appended claims.

I claim:

1. A device for sealing opposed elongate surfaces, comprising a strip of compressible resilient sealing material having opposite elongate sides for engagement with said surfaces, and having a relatively stiff elongate web embedded in and completely enclosed and sealed by the material of the strip; and snap fastener parts located at intervals along said strip and secured to said web, each of said fastener parts projecting only from one side of the strip and the web being parallel to said side of the strip and extending laterally around the sides of said fasteners to compress and press the strip around the fasteners against the surface to provide a seal surrounding each of said fasteners, the opposite side of the strip having a continuous and unbroken surface throughout its length.

2. A device for sealing opposed elongate surfaces, comprising a strip of compressible resilient sealing material having opposite elongate sides for engagement with said surfaces, and having a relatively stiff elongate reinforcing member embedded in and completely enclosed and sealed by the material of the strip, said reinforcing member being sufficiently flexible to permit the device to conform to surfaces of irregular contour; and snap fastener parts located at intervals along said strip and secured to said reinforcing member, said snap fastener parts having clip-like head portions engageable with opposite sides of said reinforcing member at any desired point thereon and having spring-type shank portions projecting only from one side of the strip, said reinforcing member being parallel to said one side of the strip and extending laterally around the sides of the head portions of said snap fastener parts to compress and press the strip around the snap fastener parts against the surface to provide a seal surrounding each of the snap fastener parts.

3. The device defined in claim 2, wherein the reinforcing member comprises a flat, sinuous wire element and wherein the head portions of the snap fastener parts are engageable with selected loops of the wire element.

GEORGE E. GAGNIER.

REFERENCES CITED

The following references are of record in the file of this patent:

UNITED STATES PATENTS

| Number | Name | Date |
| --- | --- | --- |
| 1,687,589 | Randall | Oct. 16, 1928 |
| 2,070,839 | Place | Feb. 16, 1937 |
| 2,146,090 | O'Rourke | Feb. 7, 1939 |
| 2,161,648 | Widman | June 6, 1939 |
| 2,189,795 | Hartbauer | Feb. 13, 1940 |
| 2,215,258 | Upham | Sept. 17, 1940 |
| 2,237,059 | Reid | Apr. 1, 1941 |
| 2,283,783 | Barr | May 19, 1942 |
| 2,299,598 | Schlegel | Oct. 20, 1942 |